United States Patent
Chen (10) Patent No.: US 10,976,958 B2
(45) Date of Patent: Apr. 13, 2021

(54) METHOD FOR CONTROLLING STORAGE DEVICE

(71) Applicant: Silicon Motion Inc., Hsinchu County (TW)

(72) Inventor: Chun-Chieh Chen, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 211 days.

(21) Appl. No.: 16/027,354

(22) Filed: Jul. 4, 2018

(65) Prior Publication Data
US 2019/0332321 A1 Oct. 31, 2019

(30) Foreign Application Priority Data
Apr. 27, 2018 (TW) .............................. 107114403 A (51) Int. Cl.
| | |
|---|---|
| *G06F 11/00* | (2006.01) |
| *G06F 3/06* | (2006.01) |
| *G06F 11/07* | (2006.01) |
| *G06F 13/42* | (2006.01) |
| *G06F 13/16* | (2006.01) |

(52) U.S. Cl.
CPC .......... *G06F 3/0659* (2013.01); *G06F 3/0604* (2013.01); *G06F 3/0679* (2013.01); *G06F 11/0727* (2013.01); *G06F 11/0751* (2013.01); *G06F 11/0793* (2013.01); *G06F 13/1668* (2013.01); *G06F 13/4221* (2013.01); *G06F 2213/0036* (2013.01); *G06F 2213/0042* (2013.01)

(58) Field of Classification Search
CPC .......... G06F 3/0659; G06F 2212/1048; G06F 2213/0026; G06F 3/0632; G06F 2212/7203; G06F 3/0656; G06F 2212/7208; H04L 69/08
See application file for complete search history.

(56) References Cited

U.S. PATENT DOCUMENTS

| | | | |
|---|---|---|---|
| 7,225,289 B2 * | 5/2007 | Tee .......................... | G06F 3/061 710/315 |
| 8,417,866 B2 * | 4/2013 | Chang .................. | G06F 13/4291 710/105 |
| 8,423,722 B1 * | 4/2013 | Deforest ............... | G06F 3/0613 711/148 |

(Continued)

FOREIGN PATENT DOCUMENTS

| | | |
|---|---|---|
| CN | 205986931 U | 2/2017 |
| TW | 201714076 A | 4/2017 |

*Primary Examiner* — Loan L. T. Truong
(74) *Attorney, Agent, or Firm* — Winston Hsu (57) ABSTRACT

A method for controlling a storage device is provided. The method may include: transmitting an initial command conforming to a first communications protocol and a data payload including a command parameter conforming to a second communications protocol to the storage device; transmitting a setting command conforming to the first communications protocol to the storage device; transmitting a confirmation command conforming to the first communications protocol to the storage device; and according to a data payload corresponding to the confirmation command, confirming whether the initial command, the setting command, and the confirmation command are successfully executed.

11 Claims, 8 Drawing Sheets

(56) References Cited

U.S. PATENT DOCUMENTS

| | | | |
|---|---|---|---|
| 8,509,391 B2* | 8/2013 | Elliot | H04L 12/40013 379/37 |
| 8,972,826 B2* | 3/2015 | Lu | H03M 13/618 714/774 |
| 2003/0093609 A1* | 5/2003 | Drabczuk | G06K 7/0008 710/315 |
| 2003/0103613 A1* | 6/2003 | Hasemann | H04Q 3/0025 379/229 |
| 2005/0086421 A1* | 4/2005 | Nassar | G06F 3/0626 711/103 |
| 2005/0097263 A1* | 5/2005 | Wurzburg | G06F 3/0607 711/103 |
| 2006/0015673 A1* | 1/2006 | Morrow | G06F 13/387 710/315 |
| 2006/0218324 A1* | 9/2006 | Zayas | G06F 13/385 710/65 |
| 2006/0224750 A1* | 10/2006 | Davies | H04W 4/12 709/229 |
| 2006/0285559 A1* | 12/2006 | Cheng | H04N 21/4122 370/522 |
| 2007/0174534 A1* | 7/2007 | Wurzburg | G06F 13/385 710/315 |
| 2009/0213732 A1* | 8/2009 | Veal | H04L 43/026 370/230 |
| 2011/0145474 A1* | 6/2011 | Intrater | G06F 13/385 711/103 |
| 2012/0066412 A1* | 3/2012 | Chang | G06F 13/4291 710/5 |
| 2012/0284460 A1* | 11/2012 | Guda | G06F 3/061 711/114 |
| 2014/0129749 A1* | 5/2014 | Bass | G06F 13/1663 710/111 |
| 2014/0351098 A1* | 11/2014 | Shafer | G06Q 10/087 705/28 |
| 2014/0359156 A1* | 12/2014 | Manber | H04L 65/602 709/231 |
| 2016/0267729 A1* | 9/2016 | Baumgarte | G07C 9/00571 |
| 2016/0293239 A1* | 10/2016 | Giovannini | G11C 29/44 |
| 2016/0330119 A1* | 11/2016 | Singh | H04L 69/18 |
| 2017/0075827 A1* | 3/2017 | Ward | G06F 13/1668 |
| 2017/0300445 A1* | 10/2017 | McKnight | G06F 13/4027 |
| 2019/0044818 A1* | 2/2019 | Nolan | H04L 41/0654 |

* cited by examiner

METHOD FOR CONTROLLING STORAGE DEVICE

BACKGROUND OF THE INVENTION

1. Field of the Invention

The present invention is related to access of flash memory, more particularly, to a method and apparatus for performing communications corresponding to a second communications protocol on a storage device conforming to a first communications protocol.

2. Description of the Prior Art

Developments in memory technology have enabled the wide application of portable or non-portable memory devices (e.g. a memory card conforming to SD/MMC, CF, MS, XD or UFS specification, a solid state drive, an embedded storage device conforming to UFS or EMMC specification). Therefore, improving access control of memories in these memory devices remains an issue to be solved in the art.

NAND flash memories may comprise single level cell (SLC) and multiple level cell (MLC) flash memories. In an SLC flash memory, each transistor used as a memory cell may have either of two electrical charge values, which may represent logic values 0 and 1, respectively. In addition, the storage ability of each transistor used as a memory cell in an MLC flash memory may be fully utilized. The transistor in the MLC flash memory is driven by a voltage higher than that in the SLC flash memory, and different voltage levels can be utilized to record information of at least two bits (e.g. 00, 01, 11, or 10). In theory, the recording density of the MLC flash memory may reach at least twice the recording density of the SLC flash memory, and is therefore preferred by manufacturers of NAND flash memories.

The lower cost and larger capacity of the MLC flash memory means it is more likely to be applied in memory devices than an SLC flash memory. The MLC flash memory does have instability issues, however. To ensure that access control of the flash memory in the memory devices meets required specifications, a controller of the flash memory is configured to apply management mechanisms for properly managing data access.

According to related art, the memory devices with the above management mechanism still have certain deficiencies. For example, although internal architecture of the memory devices may have excellent communication ability, some host devices utilize old type interfaces, which may become a bottleneck. Thus, there is a need for a novel method and associated architecture to improve overall performance without introducing side effects or in a way that is less likely to introduce side effects.

SUMMARY OF THE INVENTION

An objective of the present invention is to provide a method for controlling a storage device, to solve the aforementioned problems.

Another objective of the present invention is to provide a method for controlling a storage device, to achieve optimal performance of the memory devices without introducing side effects or in a way that is less likely to introduce side effects.

At least one embodiment of the present invention provides a method for controlling a storage device, the method comprises: transmitting an initial command conforming to a first communications protocol and a data payload comprising a command parameter conforming to a second communications protocol to the storage device; transmitting a setting command conforming to the first communications protocol to the storage device; transmitting a confirmation command conforming to the first communications protocol to the storage device; and according to a data payload corresponding to the confirmation command, confirming whether the initial command, the setting command, and the confirmation command are successfully executed.

At least one embodiment of the present invention provides a method for controlling a storage device, the method comprises: transmitting an initial command conforming to a first communications protocol and a data payload comprising a command parameter conforming to a second communications protocol to the storage device; and transmitting a setting command conforming to the first communications protocol to the storage device.

One of advantages of the present invention is that the method and associated apparatus of the present invention can perform properly controlling, to achieve optimal performance of storage devices. For example, the first communication protocol may comprise a small computer system interface (SCSI) protocol, and the second communications protocol may comprise a non-volatile memory express (NVMe) protocol. According to associated technologies, any definition related to NVMe commands cannot be seen in the SCSI protocol, currently. The method and associated apparatus of the present invention can perform a novel workflow, such as that with one or a combination of a write buffer command and a read buffer command, through standard commands within current SCSI protocol, more particularly, can implement command transmitting and information receiving of the NVMe protocol.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
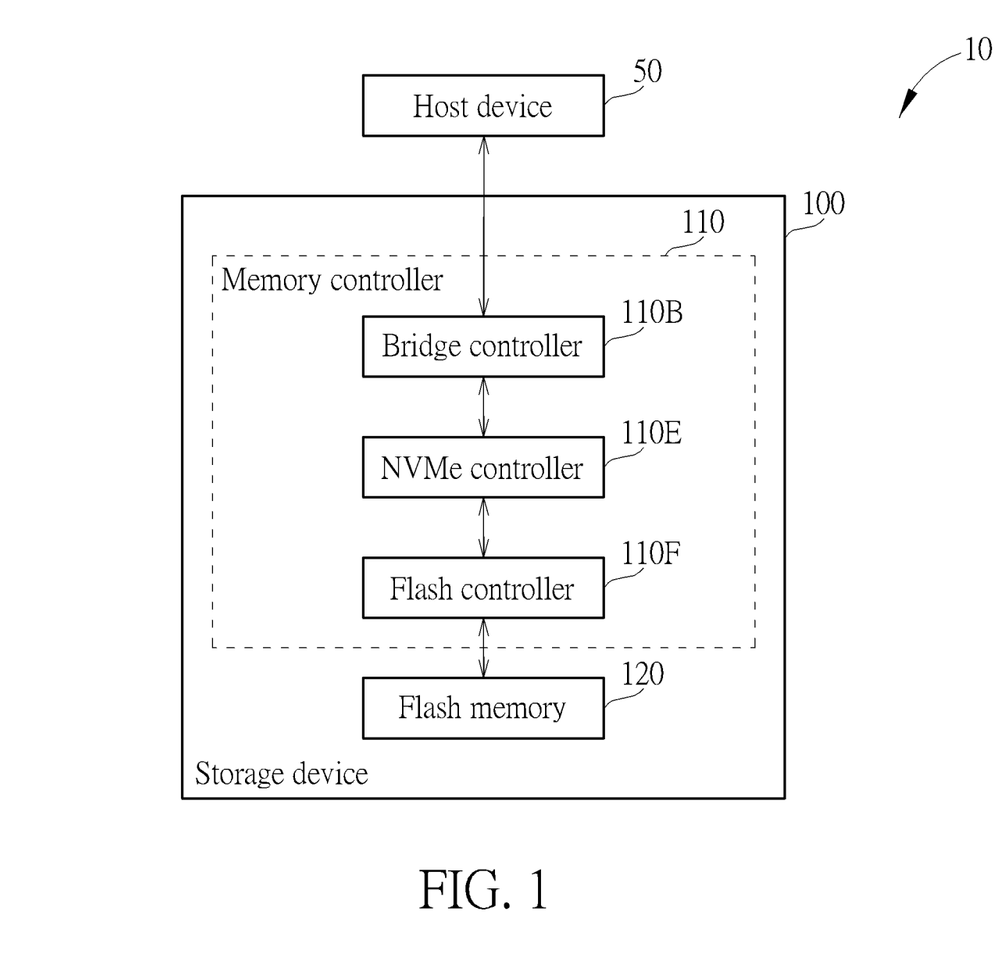
FIG. 1 is a diagram illustrating an electronic device according to an embodiment of the present invention, where the electronic device comprises a host device and a storage device.

FIG. 1 is a diagram illustrating an electronic device 10 according to an embodiment of the present invention, where the electronic device 10 comprises a host device 50 and a storage device 100. The host device 50 may comprises: at least one processor (e.g. one or more processors), arranged to control operations of the host device 50; and a power supply circuit, coupled to the aforementioned at least one processor, arranged to provide the aforementioned at least one processor and the storage device 100 with power, and output one or more driving voltages to the storage device 100, where the storage device 100 may be arranged to provide the host device 50 with storage space, and may obtain the one or more driving voltages from the host device 50 to be the power of the storage device 100. Examples of the host device 50 may include, but are not limited to: a multifunctional mobile phone, a tablet, a wearable device and a personal computer (e.g. a desktop computer or a laptop computer). Examples of the memory device 100 may include, but are not limited to: a portable memory device (e.g. a memory card conforming to the SD/MMC, CF, MS, XD or UFS specification) and a solid state drive (SSD). According to this embodiment, the memory device 100 may comprise a memory controller 110, and may further comprise a non-volatile (NV) memory (such as flash memory 120) for storing information, where the controller 110 is arranged to control operations of the memory device 100, to allow the host device 50 to access the NV memory (such as the flash memory 120) through the memory controller 110. The NV memory may comprise at least one NV memory element (e.g. one or more NV memory elements). For example, the flash memory 120 may comprise a plurality of flash memory chips (which may be referred to as "flash chip", for brevity) or a plurality of flash memory dies (which may be referred to as "flash die", for brevity), but the present invention is not limited thereto.

As shown in FIG. 1, the memory controller 110 may comprise a bridge controller 110B, a NV memory express (NVMe) controller 110E and a flash controller 110F. The bridge controller 110B may be arranged to execute transformation between commands of two communications protocols, for example, the bridge controller 110B transforms the command conforming to small computer system interface (SCSI) protocol of the host device 50 to the command conforming to NVMe protocol, and transmits the command conforming to the NVMe protocol to the NVMe controller 110E, the NVMe controller 110E further generates one or more memory operation commands according to the command conforming to the NVMe protocol, and then, the flash controller 110F further performs operations on the flash memory 120 according to these memory operation commands, for example, operations such as data writing, data reading, building namespace. As the bridge controller 110B exists in this architecture, the host device 50 may output the command conforming to the SCSI protocol and control the operations of the memory controller 110 (comprising the NVMe controller 110E executing the command conforming to the NVMe protocol), to achieve the objective of controlling the operations of the storage device 100, where the flash memory 120 preferably generates or updates a logical-to-physical (L2P) address mapping table (which may be referred to as "L2P table", for brevity) to manage mapping relations between physical addresses and logical addresses of user data from the host device 50. According to some embodiments, the memory controller 110 may further comprise a processing circuit (such as a microprocessor), a storage component (such as a read only memory (ROM)), a control logic circuit, a buffer memory or a transmission interface circuit, which may be coupled to one another via a bus, where the bridge controller 110B and the NVMe controller 110E may be positioned in the transmission interface circuit, and the flash controller 110F may be positioned in the logic control circuit.

According to some embodiments, the storage device 100 may have a Universal Serial Bus (USB) interface and a USB port to connect with the host device 50, and may utilizes a USB attached SCSI (UAS) specification to communicate with the host device 50. In addition, the host device 50 may transmit multiple commands conforming to the SCSI protocol to the storage device 100 to control or access the storage device 100 according to the UAS specification.

Figure 2:
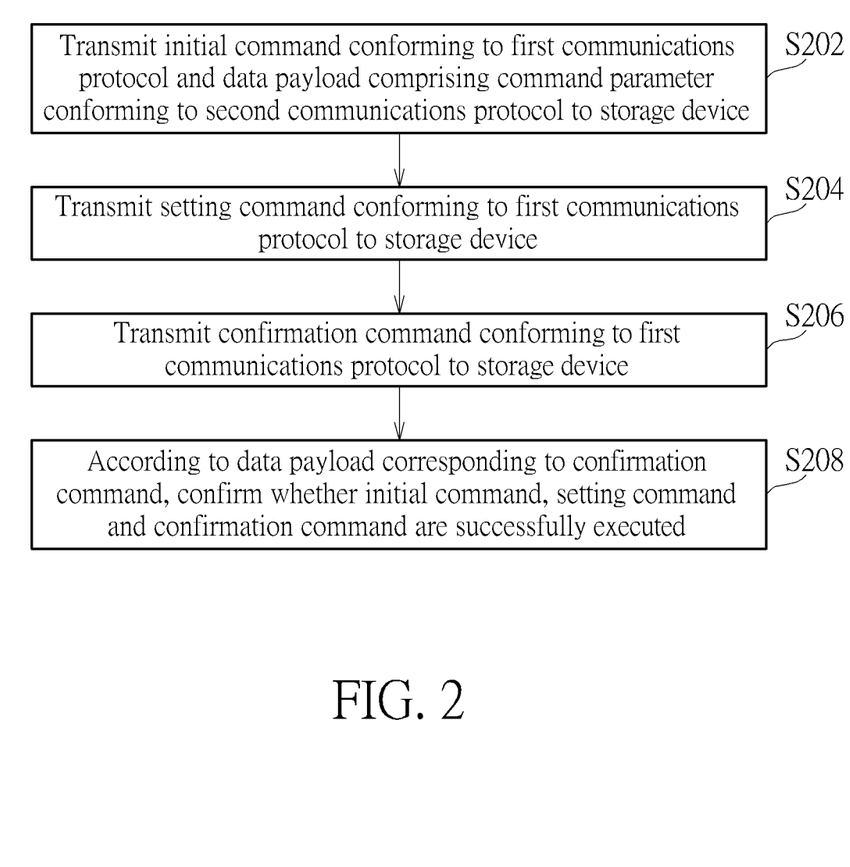
FIG. 2 is a flowchart illustrating a method for controlling the storage device according to an embodiment of the present invention.

FIG. 2 is a flowchart illustrating a method for controlling the storage device 100. The host device 50 executing the method for controlling the storage device 100 may perform multiple operations on the storage device 100, comprising: data-out, data-in, non-data operations, etc., where the data-out operation may represent outputting the data from the host device 50 to the storage device 100, the data-in operation may represent outputting the data from the storage device 100 to the host device 50, and the non-data operation may represent outputting non-user data (e.g. control parameter) from the storage device 100 to the host device 50.

Figure 3:
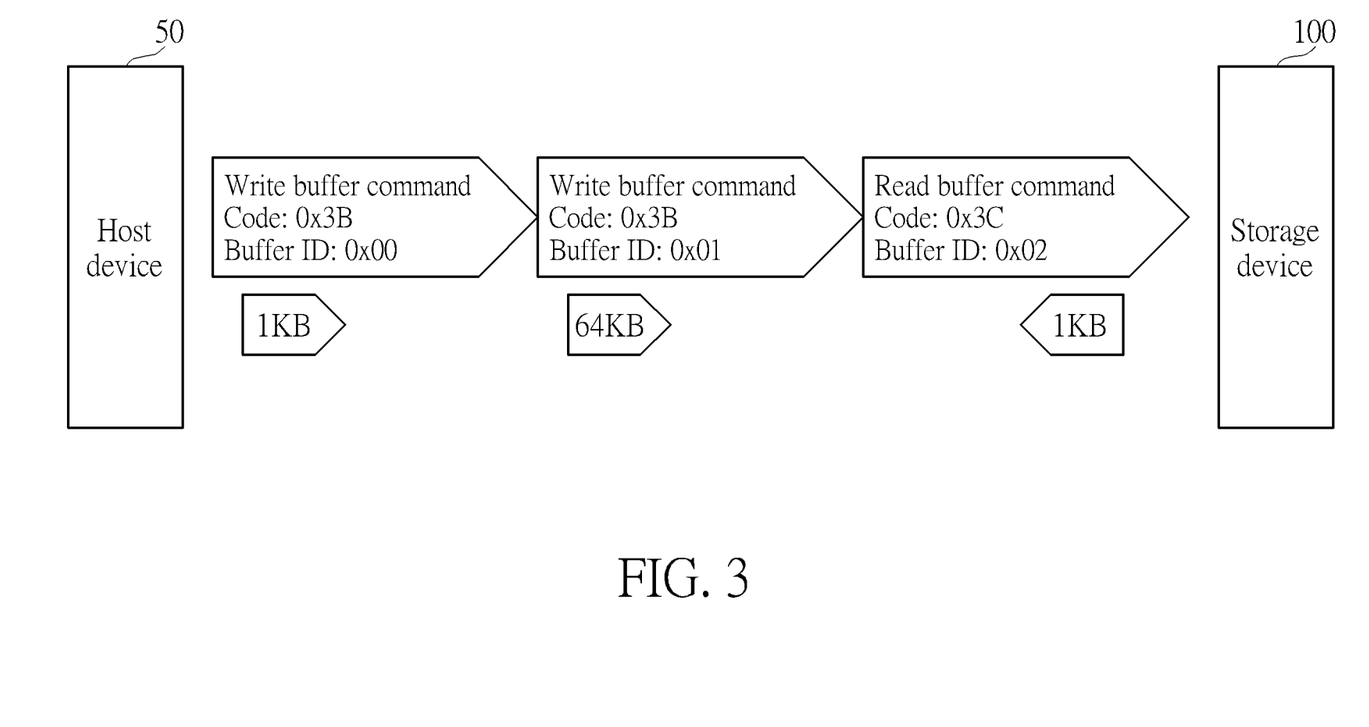
FIG. 3 illustrates a data writing control scheme of the method shown in FIG. 2 according to an embodiment of the present invention.

In Step S202, the host device 50 transmits an initial command conforming to a first communications protocol and a data payload comprising a command parameter conforming to a second communications protocol to the storage device 100. As shown in FIG. 3, the host device 50 transmits a write buffer command in which an operation code (which may be referred to as "Code", for brevity) is 0x3B and a buffer identifier (ID) is 0x00, conforming to the SCSI protocol, to the bridge controller 110B of the storage device 100. Since the initial command conforms to the write buffer command of the SCSI protocol, the bridge controller 110B can correctly identify the initial command, and since the buffer ID is 0x00, the bridge controller 110B is expected to further receive a setting command. In addition, a value of parameter length field within this write buffer command is greater than 0 (e.g. a value representing 1 kilobyte (KB)), and after transmitting the initial command, the host device 50 transmits an 1 KB data payload to the storage device 100, where the 1 KB data payload comprises required command parameters of a data writing command conforming to the NVMe protocol, which are parameters stored in bytes 00-63 within the following table (in which "Dword" stands for double word):

| Byte | Description |
| --- | --- |
| 03:00 | Command Dword 0 (CDW0) |
| 07:04 | Namespace ID (NSID) |
| 15:08 | Reserved |
| 23:16 | Metadata Pointer (MPTR) |
| 39:24 | Data Pointer (DPTR) |
| 43:40 | Command Dword 10 (CDW10) |
| 47:44 | Command Dword 11 (CDW11) |
| 51:48 | Command Dword 12 (CDW12) |
| 55:52 | Command Dword 13 (CDW13) |

-continued

| Byte | Description |
|---|---|
| 59:56 | Command Dword 14 (CDW14) |
| 63:60 | Command Dword 15 (CDW15) |
| 1023:64 | Reserved |

In addition, the host device 50 may fill the command parameters with different values according to different operations. As the definition of each of the command parameters has been described in the NVMe protocol, the associated descriptions are omitted here.

Figure 4:
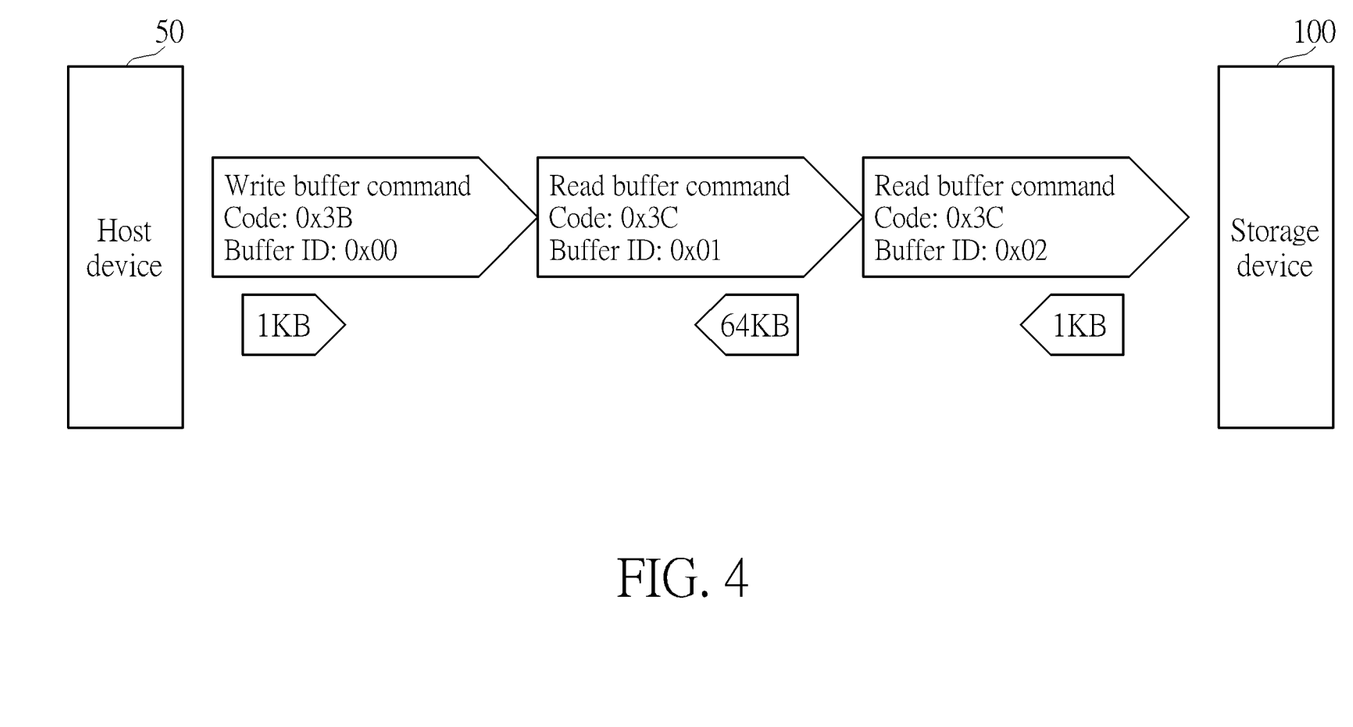
FIG. 4 illustrates a data reading control scheme of the method shown in FIG. 2 according to an embodiment of the present invention.

In Step S204, the host device 50 transmits the setting command conforming to the first communications protocol to the storage device 100, where the initial command and the setting command comprise different buffer IDs, or, the buffer IDs of the initial command and the setting command are consecutive. As shown in FIG. 3, the host device 50 may transmit the write buffer command in which the Code is 0x3B and the buffer ID is 0x00, conforming to the SCSI protocol, to the bridge controller 110B of the storage device 100. Since the setting command conforms to the write buffer command of the SCSI protocol, the bridge controller 110B can correctly identify the setting command. Or, as shown in FIG. 4, the host device 50 may transmit a read buffer command in which the Code is 0x3C and the buffer ID is 0x01, conforming to the SCSI protocol, to the bridge controller 110B of the storage device 100. Since the setting command conforms to the read buffer command of the SCSI protocol, the bridge controller 110B can correctly identify the setting command.

The bridge controller 110B generates an operation command conforming to the second communications protocol according to values of the Codes and the buffer IDs in the initial command and the setting command and the data payload comprising the command parameter conforming to the second communications protocol. For example, as shown in FIG. 3, the Codes of both of the initial command and the setting command are 0x3B, the buffer IDs of the initial command and the setting command are 0x00 and 0x01, respectively, and the bridge controller 110B generates the data writing command conforming to the NVMe protocol. Size of the data writing command is 64 bytes, and the command parameter of the data writing command is captured from the data payload in Step S202. Or, as shown in FIG. 4, the Code of the initial command is 0x3B and the Code of the setting command is 0x3C, the buffer IDs of the initial command and the setting command are 0x00 and 0x01, respectively, and the bridge controller 110B generates the data reading command conforming to the NVMe protocol. The size of the data reading command is 64 bytes, and the command parameter of the data reading command is captured from the data payload in Step S202.

In addition, if the operation command generated by the bridge controller 110B is the data writing command, the value of the parameter length field within the write buffer command transmitted by Step S204 is preferably greater than 0 (e.g. the value representing 64 KB), and after transmitting the write buffer command, the host device 50 further transmits a 64 KB data payload to the storage device 100. Provided that the length of the user data is 4 KB, the 64 KB data payload may comprise 16 user data. If the operation command generated by the bridge controller 110B is the data reading command, the value of allocation length field within the read buffer command transmitted by Step S204 is preferably greater than 0 (e.g. the value representing 64 KB), which means the host device 50 asks the bridge controller 110B to transmit the 64 KB data payload back, and this data payload is 64 KB user data. In addition, the host device 50 may also ask the bridge controller 110B to transmit the 64 KB user data and metadata thereof back, where the metadata comprises: cyclic redundancy check (CRC), timestamp, temperature while programming, etc.

Taking FIG. 3 as an example, when the bridge controller 110B generates the data writing command conforming to the NVMe protocol, the bridge controller 110B may store the user data within the received data payload into a memory (not shown) within the storage device 100, such as a random access memory (RAM), and make the value of the data pointer of the data writing command point to the address of the memory, and then, output the data writing command to the NVMe controller 110E. Since how the NVMe controller 110E executes the data writing command of the NVMe protocol is well known to a person of ordinary skill in the art, the associated descriptions are omitted here.

Taking FIG. 4 as an example, when the bridge controller 110B generates the data reading command conforming to the NVMe protocol, the bridge controller 110B may make the value of the data pointer of the data writing command point to the address of the memory (such as RAM), and then, output the data reading command to the NVMe controller 110E, and the NVMe controller 110E may store the user data from the flash memory 120 at the memory address pointed by the data pointer. After receiving the user data from the NVMe controller 110E, the bridge controller 110B transmits the 64 KB data payload back to the host device 50. Since how the NVMe controller 110E executes the data reading command of the NVMe protocol is well known to a person of ordinary skill in the art, the associated descriptions are omitted here.

In Step S206, the host device 50 may transmit a confirmation command conforming to the first communications protocol to the storage device 100, where the initial command, the setting command and the confirmation command comprise different buffer IDs, or the buffer IDs of the initial command, the setting command and the confirmation command are consecutive. As shown in FIG. 3 and FIG. 4, the host device 50 transmits the read buffer command in which the Code is 0x3C and the buffer ID is 0x02, conforming to the SCSI protocol, to the bridge controller 110B of the storage device 100. Since the confirmation command conforms to the read buffer command of the SCSI protocol, the bridge controller 110B can correctly identify the confirmation command. After the NVMe controller 110E completes executing the data writing command or the data reading command conforming to the NVMe protocol, the NVMe controller 110E may write completion elements conforming to the NVMe protocol into the memory. After receiving the confirmation command from the host device 50, the bridge controller 110B outputs the completion elements to the host device 50. In addition, since the size of the completion elements is 16 bytes, the value of the allocation length field within the read buffer command (the confirmation command) is preferably greater than 0 (e.g. the value representing 1 KB), and the bridge controller 110B packs the completion elements into a 1 KB data payload, and outputs the 1 KB data payload comprising the completion elements to the host device 50, and more particularly, the contents of the data payload is shown in the following table:

| Byte | Description | | |
|---|---|---|---|
| 03:00 | NVMe Predetermined String Tag | | |
| 07:04 | Bridge Controller Status | | |
| | Bit | | Description |
| | 0 | | Data status |
| | 31:1 | | Reserved |
| 15:08 | Completion Queue Entry: DW0 | | |
| 23:16 | Completion Queue Entry: DW1 | | |
| 31:24 | Completion Queue Entry: DW2 | | |
| 39:32 | Completion Queue Entry: DW3 | | |
| 1023:40 | Reserved | | |

Wherein, the completion elements are stored in bits 08-39. In addition, in some embodiments, the data payload may only have the contents of partial completion elements stored therein (e.g. only have the value of status field of the completion elements stored therein); or, only have the data status of the bridge controller status stored therein (e.g. "1" represents that both of the initial command and the setting command are successfully executed, and "0" represents that the initial command or the setting command is failed).

In Step S208, according to the data payload corresponding to the confirmation command, the host device 50 confirms whether the initial command, the setting command and the confirmation command are successfully executed. More particularly, if yes, the host device 50 may complete the execution of the method for controlling the storage device 100; if not, the host device 50 may trigger (or enable) an error management procedure. As the error management procedure is well known to a person of ordinary skill in the art, the associated descriptions are omitted here.

The NVMe protocol divides NVMe commands into administration command (e.g. building the namespace) and input/output command (e.g. the aforementioned data writing command and data reading command). Thus, in Step S202, the host device 50 may add a parameter (e.g. queue ID, which may be referred to as "QID", for brevity) into the data payload, and give it a different value. For example, for the administration command, the value of the QID set by the host device 50 is 0x00; for the input/output command, the value of the QID set by the host device 50 is 0x01. As a result, the bridge controller 110B may generate the corresponding administration command or input/output command conforming to the NVMe protocol according to the value of the QID within the data payload.

Figure 5:
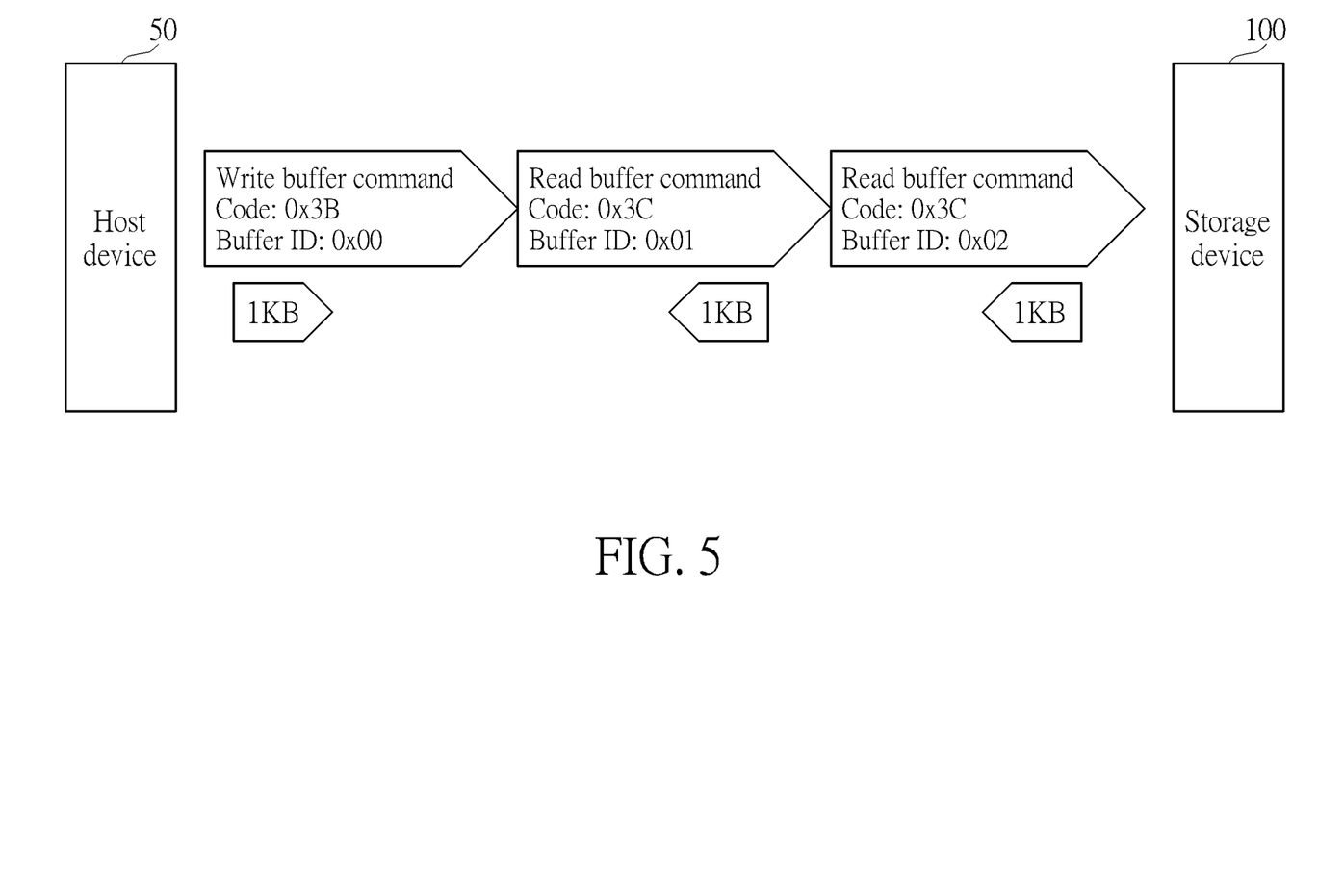
FIG. 5 illustrates a non-data operation control scheme of the method shown in FIG. 2 according to an embodiment of the present invention.

The non-data operation may output the control parameter from the storage device 100 to the host device 50, as shown in FIG. 5. The non-data operation is similar to the data-in operation, and the main difference is the subject (e.g. target content) of the data payload. As the size of the non-user data (e.g. a log page or SMART information) is smaller than that of the user data, the value of the allocation length field of the setting command in Step S204 is preferably greater than 0, for example, the value representing 1 KB, while executing the method for controlling the storage device 100 of the present invention. As a result, the log page or the SMART information may be packed into the 1 KB data payload. Since the manners of operations are similar, further descriptions are not repeated in detail here.

Figure 6:
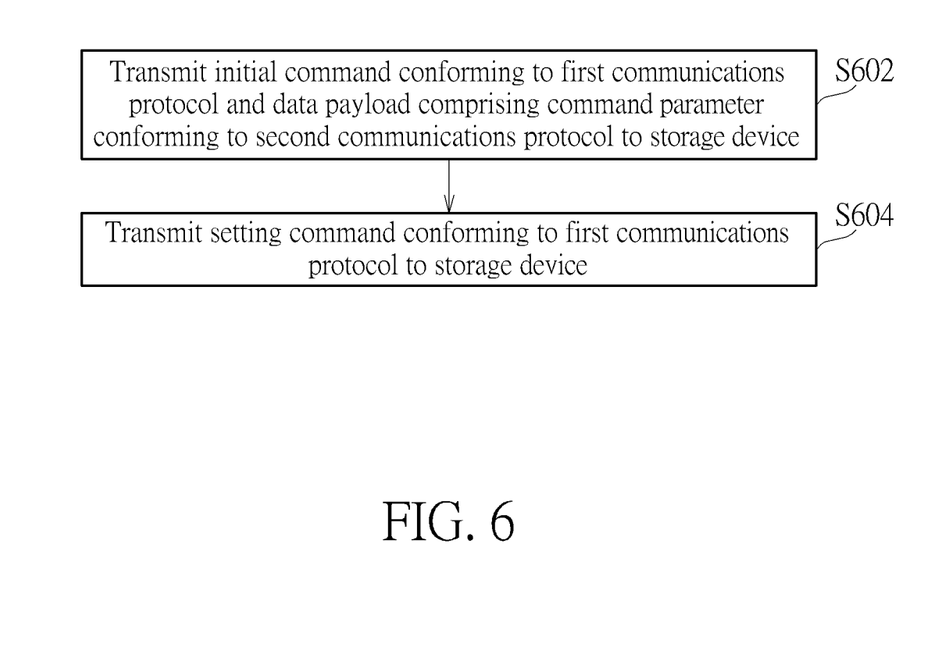
FIG. 6 is a flowchart illustrating a method for controlling the storage device according to another embodiment of the present invention.

In another embodiment, the storage device 100 is equipped with a function of general-purpose input/output (GPIO) and associated circuitry. Thus, as shown in FIG. 6, the host device 50 executing the method for controlling the storage device 100 of the present invention may also perform multiple operations on GPIO terminals of the storage device 100, for example, turning on/off the power terminal of the GPIO, turning on/off the LED terminal of the GPIO or turning on and off the LED terminal (e.g. regularly or intermittently) to make the LED blink correspondingly, setting the value of address terminal of the GPIO, and triggering (or enabling) shut-down procedure.

Figure 7:
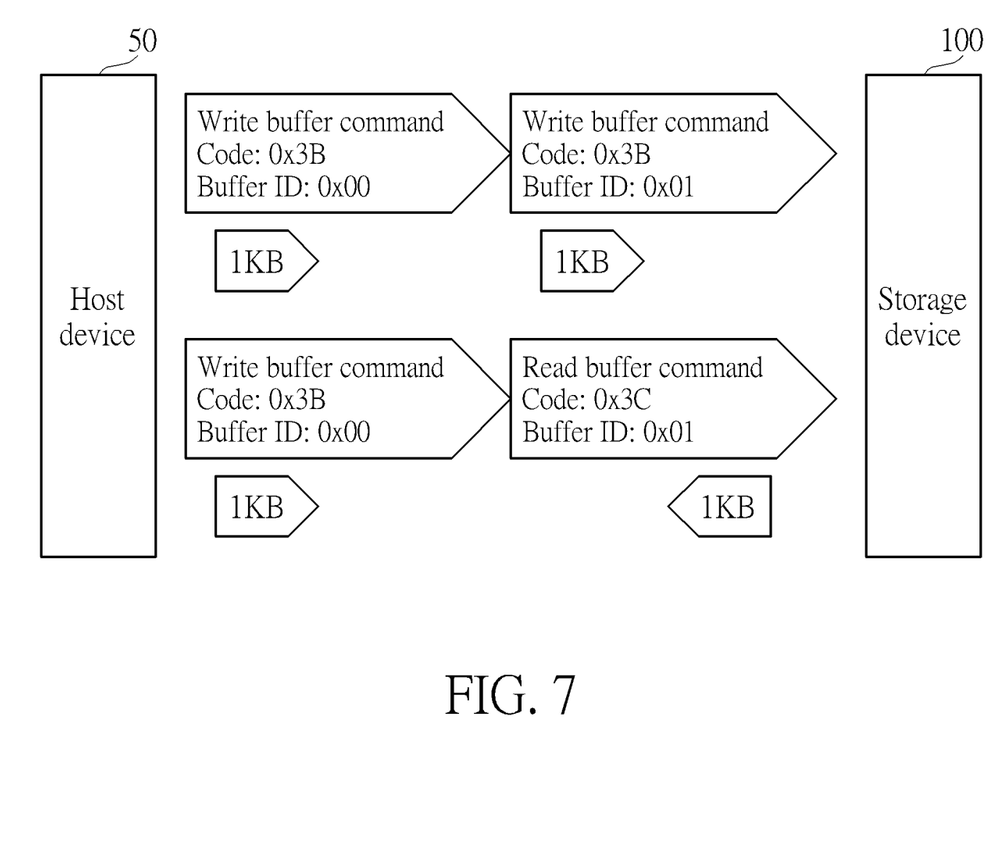
FIG. 7 illustrates a basic control scheme of the method shown in FIG. 6 according to an embodiment of the present invention.

In Step S602, the host device 50 transmits the initial command conforming to the first communications protocol and the data payload comprising the command parameter conforming to the second communications protocol to the storage device 100. As shown in FIG. 7, the host device 50 transmits the write buffer command in which the Code is 0x3B and the buffer ID is 0x00, conforming to the SCSI protocol, to the bridge controller 110B of the storage device 100. Step S602 is similar to Step S202, where the difference is that the value of the QID within the 1 KB data payload is different. When the value of the QID is 0x02, it means the host device 50 is going to perform the operation of the power terminal of the GPIO; when the value of the QID is 0x03, it means the host device 50 is going to perform the operation of the LED terminal of the GPIO; when the value of the QID is 0x04, it means the host device 50 is going to set the value of the address terminal of the GPIO; when the value of the QID is 0x05, it means the host device 50 is going to trigger (or enable) the shut-down procedure. Since the initial command conforms to the write buffer command of the SCSI protocol, the bridge controller 110B can correctly identify the initial command, and since the buffer ID is 0x00, the bridge controller 110B is expected to further receive the setting command.

In Step S604, the host device 50 transmits the setting command conforming to the first communications protocol to the storage device 100, where the initial command and the setting command comprise different buffer IDs, or the buffer IDs of the initial command and the setting command are consecutive. As shown in FIG. 7, the host device 50 transmits the write buffer command in which the Code is 0x3B and the buffer ID is 0x01, conforming to the SCSI protocol, to the bridge controller 110B of the storage device 100. Since the setting command conforms to the write buffer command of the SCSI protocol, the bridge controller 110B can correctly identify the setting command. Or, the host device 50 transmits the read buffer command in which the Code is 0x3C and the buffer ID is 0x01, conforming to the SCSI protocol, to the bridge controller 110B of the storage device 100. Since the setting command conforms to the read buffer command of the SCSI protocol, the bridge controller 110B can correctly identify the setting command.

The bridge controller 110B generates the operation command conforming to the second communications protocol according to the values of the Code and the buffer ID within the initial command and the setting command and the data payload comprising the command parameter conforming to the second communications protocol. For example, the Codes of both of the initial command and the setting command are 0x3B, the buffer IDs of the initial command and the setting command are 0x00 and 0x01, respectively, and the bridge controller 110B generates the data writing command conforming to the NVMe protocol. The size of the data writing command is 1 KB, and the command parameter within the data writing command is captured from the data payload in Step S602. For another example, the Code of the initial command is 0x3B and the Code of the setting command is 0x3C, the buffer IDs of the initial command and the setting command are 0x00 and 0x01, respectively, and the bridge controller 110B generates the data reading command conforming to the NVMe protocol. The size of the data reading command is 1 KB, and the command parameter of the data reading command is captured from the data payload in Step S602.

In addition, when the operation command generated by the bridge controller 110B is the data writing command, the value of the parameter length field within the write buffer command transmitted by Step S604 is preferably greater than 0 (e.g. the value representing 1 KB), and after transmitting the write buffer command, the host device 50 then transmits the 1 KB data payload to the storage device 100, and then, the bridge controller 110B stores the 1 KB data payload in the memory. When the operation command generated by the bridge controller 110B is the data reading command, the value of the allocation length field within the read buffer command transmitted by Step S604 is preferably greater than 0 (e.g. the value representing 1 KB), which means the host device 50 asks the bridge controller 110B to transmit the 1 KB data payload back, where a set of parameters stored in the 1 KB data payload is as shown below:

| Byte | Description | | |
|---|---|---|---|
| 03:00 | GPIO Predetermined String Tag | | |
| 04 | Terminal Status | | |
| | Terminal Type | Value | Status |
| | Power Terminal | 0 | Power Off |
| | | 1 | Power On |
| | LED Terminal | 0 | LED Off |
| | | 1 | LED On |
| | | 2 | LED Blink |
| | Address Terminal | 0-15 | Port 0-15 |
| 1023:05 | Reserved | | |

Figure 8:
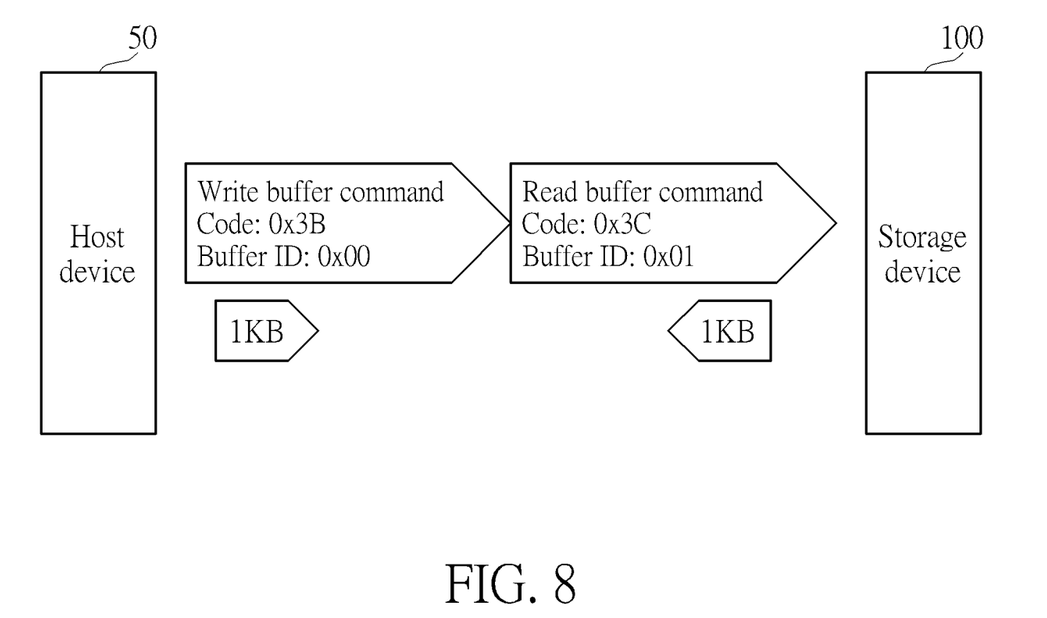
FIG. 8 illustrates a shut-down control scheme of the method shown in FIG. 6 according to an embodiment of the present invention.

When the Code of the initial command is 0x3B and the Code of the setting command is 0x3C, the buffer IDs of the initial command and the setting command are 0x00 and 0x01, respectively, and the value of the QID of the data payload of the initial command is 0x05, in the embodiment shown in FIG. 8, the bridge controller 110B directly transmits dummy data back to the host device 50 and triggers the shut-down procedure.

Briefly summarized, the present invention provides a method for performing communications corresponding to the second communications protocol on the storage device 100 conforming to the first communications protocol and associated apparatus (e.g. the electronic device 10, more particularly, the host device 50, the storage device 100 and the memory controller 110 therein). The method may comprise: based on the first communications protocol, transmitting a first phase command (e.g. the initial command, more particularly, in conjunction with the data payload comprising the command parameter conforming to the second communications protocol) to the storage device 100 according to a predetermined format corresponding to the first communications protocol, and setting the QID as predetermined information corresponding to a target operation (e.g. one of the multiple operations) in the predetermined format; base on the first communications protocol, transmitting a second phase command (e.g. the setting command) to the storage device 100 according to the predetermined format, for a receiving side (e.g. the bridge controller 110B) to combine the first phase command and the second phase command into a target command (e.g. the operation command, such as the data writing command, the data reading command, etc.), to control internal circuit(s) (e.g. the NVMe controller 110E) to execute the target command based on the second communications protocol to perform the target operation; and based on the first communications protocol, selectively obtaining the completion element from the storage device 100, to confirm executing result of the target operation, more particularly, transmitting a third phase command (e.g. the confirmation command) to the storage device 100 according to the predetermined format, to obtain the completion element from the storage device 100. Since the associated details have been described in the above embodiments, similar descriptions are not repeated in detail here.

The method and associated apparatus of the present invention can perform a novel working flow through standard commands (such as the write buffer command and the read buffer command) within the current SCSI protocol, to implement command transmitting and command receiving of the NVMe protocol in the SCSI protocol. Therefore, the architecture of the present invention can properly perform information access, management and control.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a storage device, comprising:
transmitting an initial command conforming to a first communications protocol and a data payload comprising a command parameter conforming to a second communications protocol to the storage device;
transmitting a setting command conforming to the first communications protocol to the storage device;
transmitting a confirmation command conforming to the first communications protocol to the storage device; and
according to a data payload corresponding to the confirmation command, confirming whether the initial command, the setting command, and the confirmation command are successfully executed;
wherein the initial command, the setting command and the confirmation command are different commands.

2. The method of claim 1, wherein the first communications protocol is a small computer system interface protocol.

3. The method of claim 1, wherein the second communications protocol is a non-volatile memory express protocol.

4. The method of claim 1, wherein the initial command is a write buffer command.

5. The method of claim 1, wherein the setting command is a write buffer command or a read buffer command.

6. The method of claim 1, wherein the confirmation command is a read buffer command.

7. The method of claim 1, wherein the initial command, the setting command and the confirmation command utilize different buffer identifiers (IDs).

8. The method of claim 1, wherein the storage device comprises a bridge controller.

9. The method of claim 1, further comprising:
when the initial command, the setting command and the confirmation command are not successfully executed, triggering an error management procedure.

10. The method of claim 1, wherein the data payload corresponding to the confirmation command comprises a completion element conforming to the second communications protocol.

11. The method of claim 1, wherein the data payload comprising the command parameter conforming to the second communications protocol further comprises a queue identifier (ID).

* * * * *